United States Patent
Hara et al.

(10) Patent No.: US 8,341,825 B2
(45) Date of Patent: Jan. 1, 2013

(54) METHOD FOR MANUFACTURING A THERMALLY-ASSISTED MAGNETIC HEAD

(75) Inventors: Shinji Hara, Tokyo (JP); Koji Shimazawa, Tokyo (JP); Eiji Komura, Tokyo (JP); Tsutomu Chou, Tokyo (JP); Seiichi Takayama, Tokyo (JP)

(73) Assignee: TDK Corporation, Tokyo (JP)

( * ) Notice: Subject to any disclaimer, the term of this patent is extended or adjusted under 35 U.S.C. 154(b) by 140 days.

(21) Appl. No.: 12/947,091

(22) Filed: Nov. 16, 2010

(65) Prior Publication Data
US 2012/0117791 A1 May 17, 2012

(51) Int. Cl.
*G11B 5/127* (2006.01)
*H04R 31/00* (2006.01)

(52) U.S. Cl. ............ 29/603.12; 29/603.13; 29/603.14; 29/603.15; 29/603.16; 29/603.18; 205/199; 205/122; 360/121; 360/122; 360/317

(58) Field of Classification Search ............ 29/603.07, 29/603.13–603.16, 603.18; 205/119, 122; 360/121, 122, 317; 451/5, 41
See application file for complete search history.

(56) References Cited

U.S. PATENT DOCUMENTS

| | | | |
|---|---|---|---|
| 6,741,524 B2 * | 5/2004 | Ichihara et al. ............ 369/13.01 |
| 7,330,404 B2 | 2/2008 | Peng et al. |
| 7,710,677 B2 * | 5/2010 | Tanaka et al. ................ 360/59 |
| 7,876,646 B2 * | 1/2011 | Tanaka et al. ............. 369/13.02 |
| 7,940,486 B2 * | 5/2011 | Shimazawa et al. ........... 360/59 |
| 8,077,556 B2 * | 12/2011 | Komura et al. ........... 369/13.02 |
| 8,098,547 B2 * | 1/2012 | Komura et al. ........... 369/13.33 |
| 2008/0043360 A1 | 2/2008 | Shimazawa et al. |
| 2008/0056073 A1 | 3/2008 | Shimizu |
| 2008/0205202 A1 | 8/2008 | Komura et al. |
| 2009/0059411 A1 | 3/2009 | Tanaka et al. |
| 2010/0103553 A1 | 4/2010 | Shimazawa et al. |

* cited by examiner

*Primary Examiner* — Paul D Kim
(74) *Attorney, Agent, or Firm* — Posz Law Group, PLC

(57) ABSTRACT

A thermally-assisted magnetic head includes a slider including an air bearing surface (ABS) and a waveguide with a core that extends from a light entering surface to the ABS, and a laser diode (LD) unit attached to the light entering surface. The LD unit faces the light entering surface, and a photo detector faces the ABS. A polarizer that only transmits light having a polarization component orthogonal to a polarization direction of linearly polarized laser light is disposed between the ABS and the photo detector. An LD of the LD unit is activated, and the linearly polarized laser light enters the core from the light entering surface. Light radiated from the ABS enters the polarizer, and an alignment of the slider and the LD unit is performed while the photo detector detects the light transmitted through the polarizer.

6 Claims, 12 Drawing Sheets

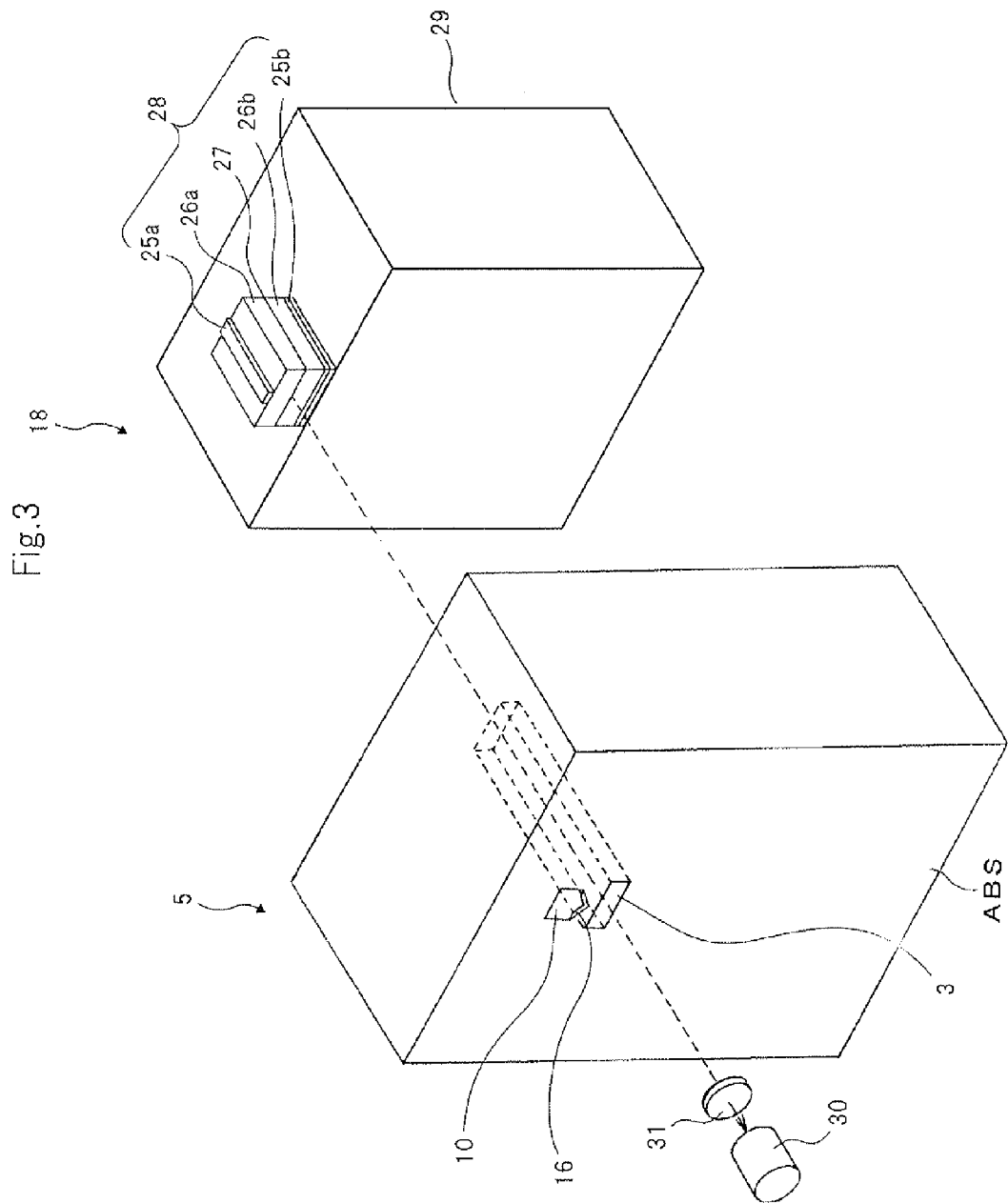

METHOD FOR MANUFACTURING A THERMALLY-ASSISTED MAGNETIC HEAD

BACKGROUND OF THE INVENTION

1. Field of the Invention

The present invention relates to a method for manufacturing a thermally-assisted magnetic head, which irradiates near-field light to a magnetic recording medium, reduces coercive force of the magnetic recording medium, and records information.

2. Description of the Related Art

In recent years, for magnetic recording devices such as magnetic disk devices, etc., performance improvements of a magnetic head and a magnetic recording medium are demanded in association with high recording density. As the magnetic head, a composite-type magnetic head, in which a reproducing head that has a magneto resistive effect element (MR element) for reading and a magnetic recording head that has an inductive-type electromagnetic transducer element (a magnetic recording element) for writing are laminated on a substrate, has widely been utilized. In the magnetic disk devices, the magnetic head flies slightly above a surface of the magnetic recording medium.

The magnetic recording medium is a discontinuous medium on which magnetic microparticles gather. Each of the magnetic microparticles has a single magnetic domain structure. Of the magnetic recording medium, one recording bit is configured with a plurality of the magnetic microparticles. In order to increase the recording density, the asperity of a boundary of adjacent recording bits needs to be small. For this, the size of the magnetic microparticles needs to be small. However, when the size of the magnetic microparticles is small, thermal stability of the magnetization of the magnetic microparticles is also decreased due to the decrease in the volume of the magnetic microparticles. In order to solve this problem, increasing the anisotropy energy of the magnetic microparticles is effective. However, when the anisotropy energy of the magnetic microparticles is increased, the coercive force of the magnetic recording medium is also increased. As a result, it becomes difficult to record information using a conventional magnetic recording head. The conventional magnetic recording head has such a drawback, and this is a large obstacle to achieving an increase in the recording density.

As a method to solve this problem, a so-called thermally-assisted magnetic recording method has been proposed. In this method, a magnetic recording medium that has a large coercive force is utilized. The magnetic field and heat are simultaneously added to a portion of the magnetic recording medium where information is recorded at the time of recording the information. Using this method, the information is recorded under a state where the temperature is increased and the coercive force is decreased in the information record part.

For a thermally-assisted magnetic recording, it is common to utilize a laser light source for heating the magnetic recording medium. There are two types of methods for the heating: one method is to heat the magnetic recording medium by guiding laser light to a recording part via a waveguide, etc. (a direct heating type); and the other method is to heat the magnetic recording medium by converting the laser light to near-field light (a near-field light heating type). The near-field light is a type of electromagnetic field that is formed around a substance. Ordinary light cannot be tapered to a smaller region than its wavelength due to diffraction limitations. However, when light having an identical wavelength is irradiated onto a microstructure, near-field light that depends on the scale of the microstructure is generated, enabling the light to be tapered to a minimal region of approximately tens of nm in size. Since the thermally-assisted recording targets a recording density region that requires selective heating only to the minimal region of approximately tens of nm, the near-field light heating type is preferred.

In U.S. Patent Application Publication No. 2008/205202, a configuration is disclosed in which a near-field-generator is disposed in a front part of a core of a waveguide through which light from a laser diode (LD) propagates.

As a concrete method for generating the near-field light, a method using a so-called plasmon antenna, which is a metal referred to as a near-field light probe that generates near-field light from light-excited plasmon, is common.

Direct irradiation of light generates the near-field light in the plasmon antenna; however, a conversion efficiency of converting irradiated light into the near-field light is low with this method. Most of the energy of the light irradiated on the plasmon antenna reflects off the surface of the plasmon antenna or is converted into thermal energy. The size of the plasmon antenna is set to the wavelength of the light or less, so that the volume of the plasmon antenna is small. Accordingly, the temperature increase in the plasmon antenna resulting from the light energy being converted into the thermal energy is significantly large.

Due to the temperature increase, the volume of the plasmon antenna expands, and the plasmon antenna protrudes from an air bearing surface (ABS), which is a surface facing the magnetic recording medium. Then, the distance between an edge part of the MR element on the ABS and the magnetic recording medium increases, causing a problem that servo signals recorded on the magnetic recording medium cannot be read during the recording process. Moreover, when the heat generation is large, the plasmon antenna may melt.

Currently, a technology is proposed that does not directly irradiate light onto the plasmon antenna. For example, U.S. Pat. No. 7,330,404 discloses such a technology. In this technology, light propagating through a waveguide such as an optical fiber, etc. is not directly irradiated onto the plasmon antenna; however the light is coupled with a plasmon generator in a surface plasmon mode via a buffer portion to excite the surface plasmon in the plasmon generator. The plasmon generator includes a near-field-generator that is positioned on the ABS and that generates the near-field light. At the interface between the waveguide and the buffer portion, the light propagating through the waveguide completely reflects off, and light, which is referred to as evanescent light that penetrates into the buffer portion, is simultaneously generated. The evanescent light and a collective oscillation of charges in the plasmon generator are coupled, and the surface plasmon is then excited in the plasmon generator. The excited surface plasmon propagates to the near-field-generator along the plasmon generator, and then generates near-field light in the near-field-generator. According to this technology, since the light propagating through the waveguide is not directly irradiated to the plasmon generator, an excessive temperature increase of the plasmon generator is prevented.

In U.S. Patent Application Publication No. 2010/103553, a configuration in which a propagation edge is disposed in a plasmon generator that couples to light in a surface plasmon mode is disclosed. The propagation edge has an extremely narrow region, and is for propagating a surface plasmon generated to a near-field-generator that is positioned on an ABS.

Such a thermally-assisted magnetic head must be arranged such that light propagates through a core of a waveguide so as to couple to the plasmon generator that faces the core in the surface plasmon mode. For this, a laser diode (LD) unit including an LD is attached to a slider that is a base of the thermally-assisted magnetic head, enabling laser light to enter into the core. U.S. Patent Application Publication No. 2008/043360 exemplifies a configuration in which an LD unit is attached to a slider.

For the thermally-assisted magnetic head in which the LD unit is attached to the slider as described above, an alignment (light core alignment) of the LD and the core of the waveguide is important in order to guide laser light, which the LD generates, to the plasmon generator by the laser light propagating through the core of the waveguide. When a positional gap between the LD and the core is present, energy loss occurs, causing unnecessary heat generation. As a result, the heat may cause alterations and/or deformations on each part of the slider. Also, since it is necessary for high energy laser light to enter into the core in view of the fact that the loss may occur, the LD needs to generate the high energy laser light, which in turn causes negative effects, such as a short lifetime.

As one example of an alignment method of the core of the thermally-assisted magnetic head and the LD, U.S. Patent Application Publication No. 2009/0059411 discloses a method in which a large number of alignment marks are disposed on an LD unit and/or a slider, and the LD unit and the slider are positioned using the alignment marks. However, since laser light irradiated from the LD of the LD unit is not actually checked, sufficient positional accuracy may not be obtained.

In U.S. Patent Application Publication No. 2008/0056073, a so-called active alignment method is disclosed in which an LD actually generates laser light and a slider and an LD unit are aligned while the light propagating through a core in the slider and emitted from an ABS are monitored with a photo detector positioned facing the ABS. According to this method, the alignment of the slider and the LD unit is performed such that a light coupling efficiency becomes maximum. However, even if the alignment of the slider and the LD unit is performed according to this method, heat application efficiency of a magnetic recording medium may not be sufficient at the time of the thermally-assisted magnetic recording.

SUMMARY OF THE INVENTION

The object of the invention is to provide a method for manufacturing a thermally-assisted magnetic head that efficiently heats a magnetic recording medium by appropriately aligning a core of a waveguide in a slider and a laser diode (LD), the waveguide guiding light to an air bearing surface, and the LD generating the light that is to enter the core.

In a method of the present invention for manufacturing a thermally-assisted magnetic head that includes a slider and an LD unit, the slider including an air bearing surface (ABS) that faces a recording medium and including a waveguide with a core for light propagation that extends from a light entering surface, which is different from the ABS, to the ABS, the LD unit being attached to the light entering surface of the slider, and the thermally-assisted magnetic head performing magnetic recording while heating the recording medium with near-field light that is excited from linearly polarized laser light, the LD unit is disposed in a position facing the light entering surface of the slider, a photo detector is disposed in a position facing the ABS of the slider, and a polarizer transmitting only light having a polarization component that is orthogonal to a polarization direction of the linearly polarized laser light is disposed between the ABS and the photo detector. An LD of the LD unit is activated, and the linearly polarized laser light is enabled to enter into the core from the light entering surface of the slider. Light radiated from the ABS is enabled to enter into the polarizer, and an alignment of the slider and the LD unit is performed while the photo detector detects light that is transmitted through the polarizer.

The above and other objects, features, and advantages of the present invention will become apparent from the following description with reference to the accompanying drawings, which illustrate examples of the present invention.

BRIEF DESCRIPTION OF THE DRAWINGS

FIG. 3 is a perspective view illustrating an alignment process of a slider and an LD unit of the thermally-assisted magnetic head of the present invention;

DESCRIPTION OF THE PREFERRED EMBODIMENTS

A thermally-assisted magnetic head of the present invention will be described referring to the figures. Initially, a basic configuration of a thermally-assisted magnetic head 1 of the present invention will be described. The thermally-assisted magnetic head 1 performs a so-called thermally-assisted magnetic recording, which records information by applying a magnetic field when coercive force is partially decreased by heating the magnetic recording medium.

Figure 1:
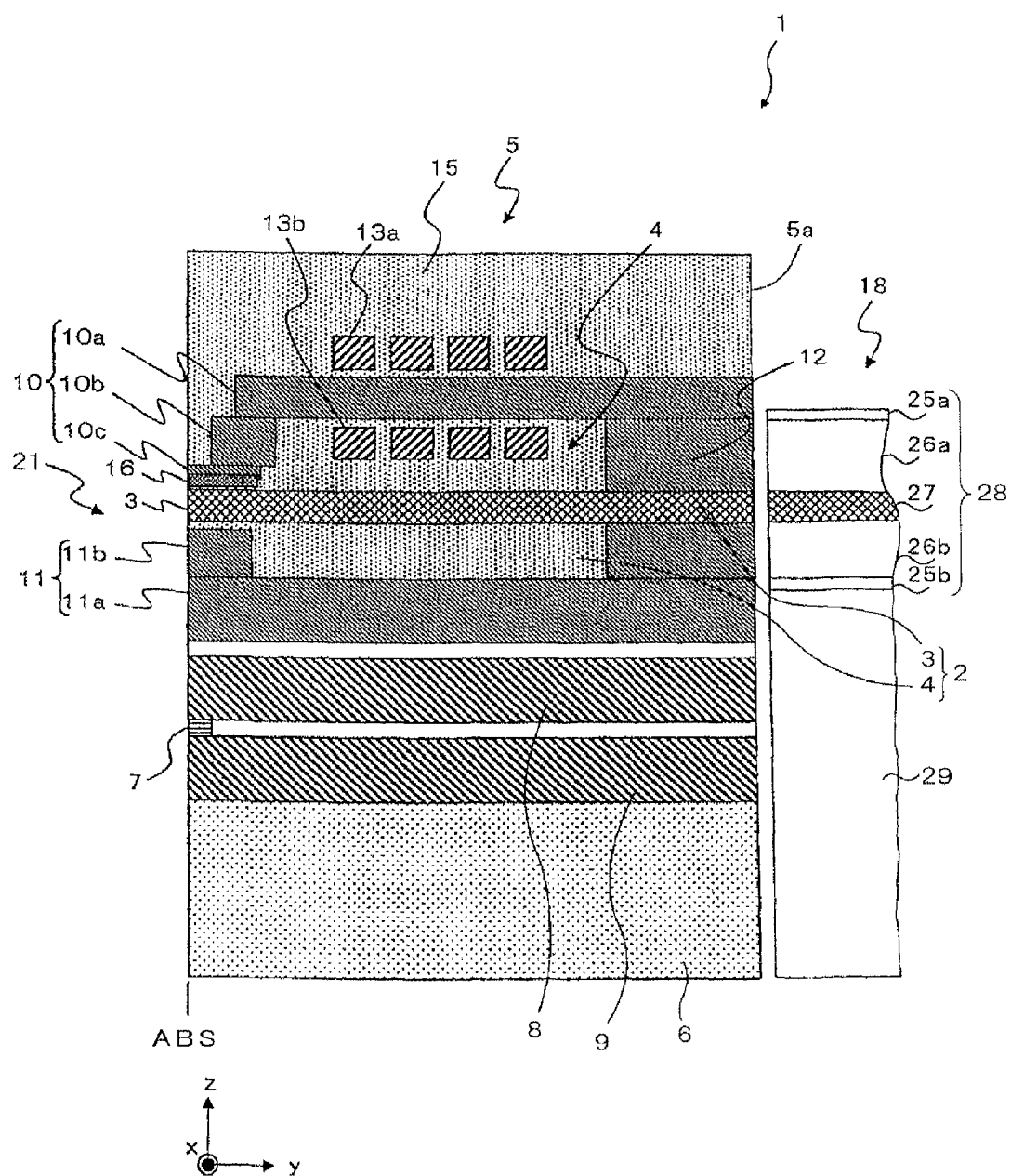
FIG. 1 is a cross sectional view of a main part of a thermally-assisted magnetic head of the present invention.
Figure 2:
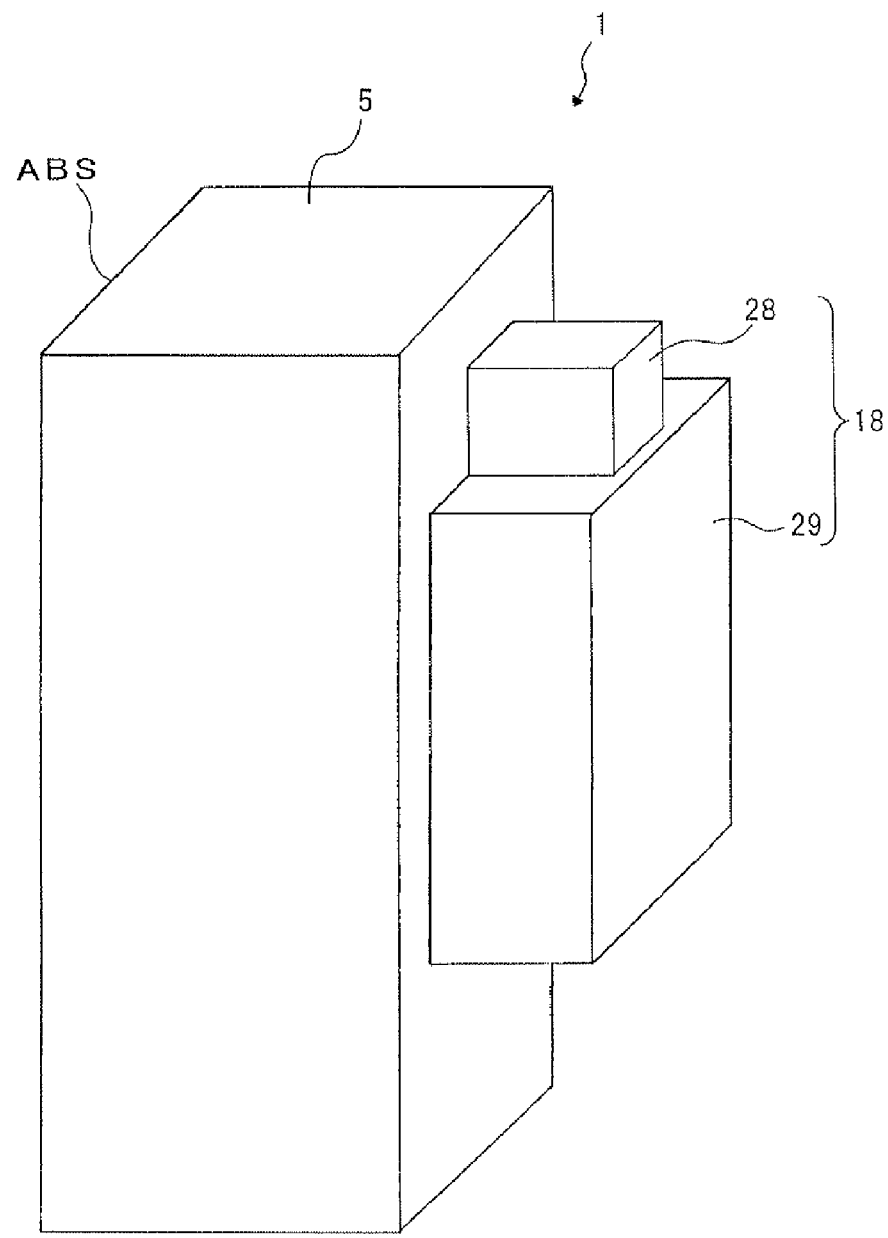
FIG. 2 is a perspective view of the thermally-assisted magnetic head of the present invention.

As illustrated in FIGS. 1 and 2, the thermally-assisted magnetic head 1 is configured with a slider 5 and a laser diode (LD) unit 18. The slider 5 includes an MR element 7 that configures a reproducing head part, a magnetic recording element 21 that configures a recording head part, and a waveguide 2 into which laser light utilized to heat the magnetic recording medium enters. The waveguide 2 is configured with a core 3 and a cladding 4 that surrounds the vicinity of the core 3. The LD unit 18 includes an LD 28 that is a light source for generating laser light and an LD sub-mount 29 that is a substrate for supporting the LD 28. For sake of simplicity, in FIG. 1, a gap is illustrated between the slider 5 and the LD unit 18; however, the slider 5 and the LD unit 18 are attached firmly in contacting manner without the gap when the thermally-assisted magnetic head is assembled. In the thermally-assisted magnetic head 1, it is preferred that the magnetic recording medium is efficiently heated by near-field light that is converted from the laser light. In order to efficiently heat desired positions (positions to be recorded) of the magnetic recording medium with small energy loss, an appropriate alignment of the core 3 of the slider 5 and the LD 28 of the LD unit 18 is performed.

In the present invention, as illustrated in FIG. 3, a polarizer 31 is disposed between a photo detector 30 that is utilized for active alignment and an air bearing surface (ABS) of the slider 5. The polarizer 31 is a polarization filter that transmits only light having a polarization direction that is orthogonal to a polarization direction of linearly polarized laser light entering into the core 3 of the slider 5 in a plane (a light reception surface of the polarizer 31) perpendicular to a traveling direction of the laser light. Under such a state, laser light from the LD 28 enters into the core 3 from a back surface 5a (a light entering surface that is a different surface from the ABS) of the slider 5. While the photo detector 30 detects the light that passes through the polarizer 31 in the vicinity of the ABS of the slider 5, the active alignment of the slider 5 and the LD unit 18 is performed to maximize strength of the light detected by the photo detector 30.

The technical significance of this alignment process will be explained.

In the case of utilizing a conventional active alignment method as disclosed in U.S. Patent Application Publication No. 2008/0056073, laser light from the LD 28 enters into the core 3 at the back surface 5a (the light entering surface) of the slider 5, the slider 5 and the LD unit 18 are aligned to maximize the strength of light emitted from the ABS of the slider 5. However, in the case without the polarizer 31, even if the alignment of the slider 5 and the LD unit 18 is performed as described above, a heating efficiency of the magnetic recording medium during the thermally-assisted magnetic recording may be insufficient. This indicates that an alignment condition where the strength of the light emitted from the ABS is maximized and another alignment condition where the heating efficiency of the magnetic recording medium is maximized do not always correspond with one another.

The present inventors considered this phenomenon and concluded the following. In a near-field light heating method, light that passes through the core 3 of the slider 5 and that is emitted from the ABS is light that propagates without being converted to the near-field light, and does not significantly contribute to the heating of the magnetic recording medium. What does contribute to the heating of the magnetic recording medium is the near field light, which is converted from the light propagating through the core 3. Also, a center of the near-field light and a center of propagation light that is emitted from the ABS do not always correspond with one another. Due to a relative deference of the light strengths, the photo detector 30 that is positioned facing the ABS detects primarily the propagation light that is emitted from the ABS and detects very little of the near field light.

Figure 4A:
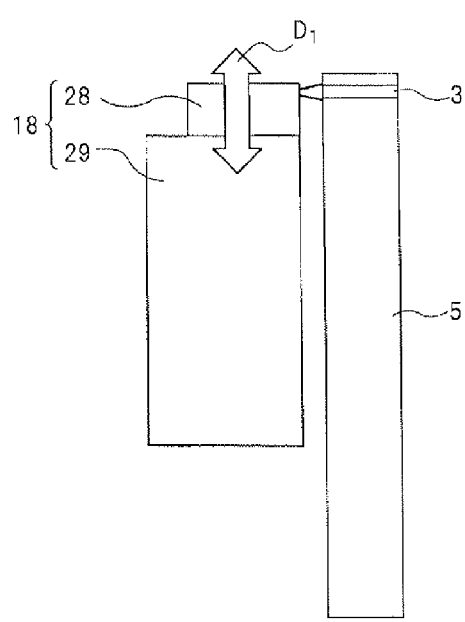
FIG. 4A is a side view illustrating an example of a polarization direction of laser light entering from the LD unit into a core of the slider.
Figure 4B:
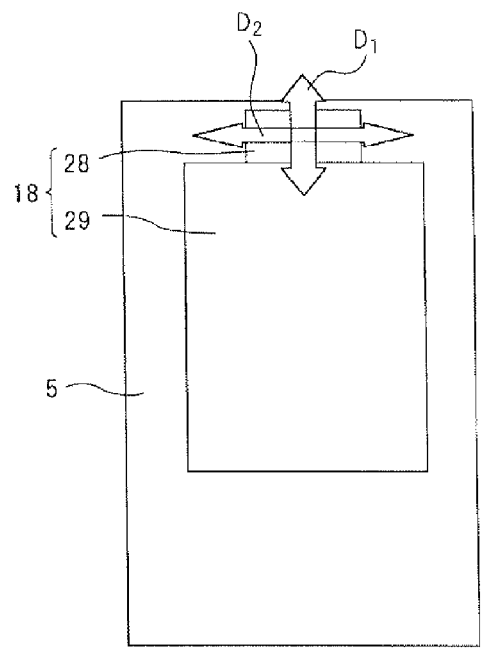
FIG. 4B is a front view illustrating a relationship between the polarization direction of the laser light entering from the LD unit into the core of the slider and a polarization direction of scattering light that is generated in accompaniment with generation of near-field light converted from the laser light.

Generally, when linearly polarized light enters into and propagates through the core 3 of the waveguide 2, a polarization direction thereof is maintained. For example, as illustrated in FIGS. 4A and 4B, when light, which has a polarization direction $D_1$ that is parallel to a longitudinal direction of the LD unit 18 (that is perpendicular to a contact surface of the LD 28 and the LD sub-mount 29), enters into the core 3, light, which has the polarization direction $D_1$ that is parallel to the longitudinal direction of the LD unit 18, is emitted from the ABS without changing the polarization direction and is detected by the photo detector 30.

On the other hand, the near-field light converted from the laser light generates secondary scattering light, and the scattering light includes a polarization component that is rotated by 90 degrees in a plane that is perpendicular to the traveling direction of the laser light with respect to the original laser light. In other words, when light, which has the polarization direction $D_1$ that is parallel to the longitudinal direction of the LD unit 18, enters into the core 3, scattering light, which includes a polarization component $D_2$ (a polarization component orthogonal to the polarization direction of the light that enters into the core 3) that is orthogonal to the longitudinal direction of the LD unit 18 (that is parallel to the contact surface of the LD 28 and the LD sub-mount 29), is generated simultaneously with generation of the near-field light. The strength of the polarization component $D_2$ that is rotated by 90 degrees is in a linear relationship with the strength of the near-field light.

Figure 5:
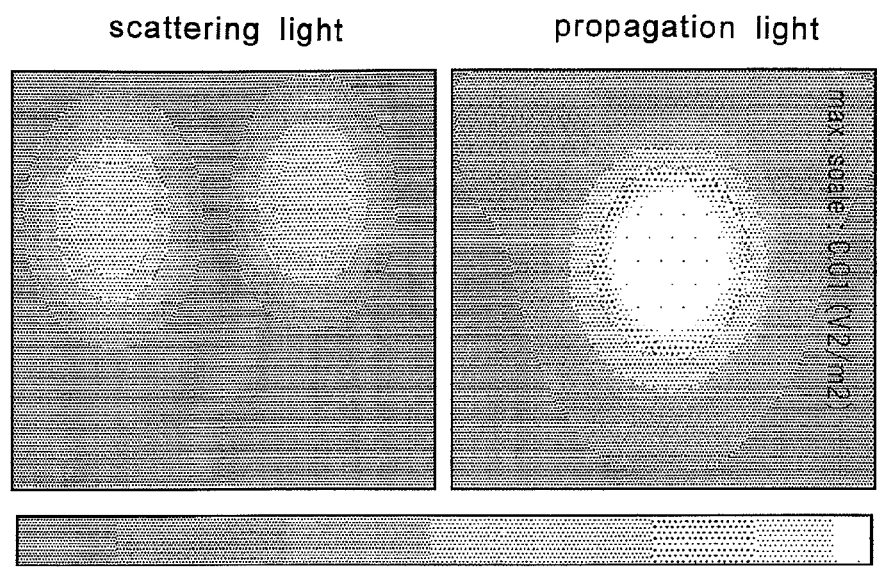
FIG. 5 is an explanatory view illustrating, of the light emitted from an ABS of the slider of the thermally-assisted magnetic head, light strength of a polarization component that is parallel to the polarization direction of the light entering into the core and light strength of a polarization component that is orthogonal to the polarization direction of the light entering into the core.

As illustrated above, comparing the strength of the propagation light, which passes through the core 3 and which is emitted from the ABS maintaining the polarization direction $D_1$, with the strength of the scattering light, which includes the polarization component $D_2$, which is generated in accompaniment with the generation of the near-field light, and which is rotated by 90 degrees in the plane that is perpendicular to the traveling direction of the laser light, the strength of the propagation light is much greater. Therefore, when the polarizer 31 does not exist, the photo detector 30 primarily detects the propagation light. FIG. 5 illustrates light detection images under this situation of the photo detector 30. The right side of FIG. 5 illustrates only the light (the propagation light) that has the polarization component $D_1$ that is parallel to the polarization direction of the light that enters into the core 3 out of the light detected by the photo detector 30. The left side of FIG. 5 illustrates only the light (the scattering light) that has the polarization component $D_2$ that is orthogonal to the polarization direction of the light that enters into the core 3 out of the light detected by the photo detector. As is obvious from FIG. 5, comparing in the same standard, the scattering light having the polarization component $D_2$ that is orthogonal to the polarization direction of the light that enters into the core 3 is recognized to a lesser degree compared to the propagation light having the polarization component $D_1$ that is parallel to the polarization direction of the scattering light.

Figure 6:
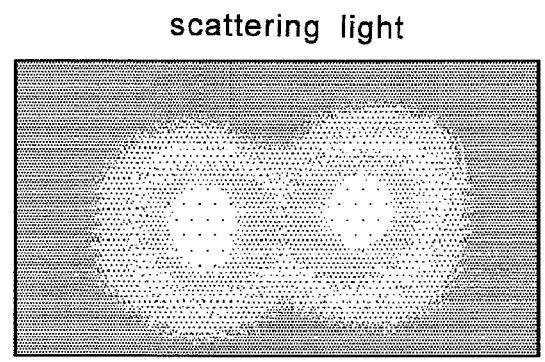
FIG. 6 is an explanatory view illustrating, of light emitted from the ABS of the slider of the thermally-assisted magnetic head, light strength of light that is transmitted through a polarizer and that is received by a photo detector.

In the present invention, disposed between the ABS and the photo detector 30 is the polarizer 31 that transmits only the light having the polarization component $D_2$ that is orthogonal to the polarization direction $D_1$ of the light that enters into the core 3 (the polarization direction of the propagation light that is emitted from the ABS) in the plane (the light reception surface of the polarizer) that is perpendicular to the traveling direction of the laser light. Therefore, the polarizer 31 blocks the propagation light that is emitted from the ABS, and only the scattering light in accompaniment with the generation of the near-field light transmits through the polarizer 31, and the photo detector 30 detects the scattering light. FIG. 6 illustrates a light detection image resulting from the above situation with the photo detector 30. Referring to FIG. 6, the propagation light that is the same as the light illustrated on the right side of FIG. 5 is recognized to a lesser degree; however, the scattering light is clearly recognized. Additionally, the light strength of the scattering light is low; however, the light strength of the scattering light can be precisely obtained when a sophisticated photo detector 30 is utilized or when the output of the photo detector 30 is amplified.

As described above, in the present invention, only the scattering light that has the polarization component $D_2$ that is orthogonal to the polarization direction $D_1$ of the light that enters into the core 3 is detected when the polarizer 31 is used. Then, the active alignment of the slider 5 and the LD unit 18 is performed to maximize the strength of the scattering light. Since the strength of the scattering light is linearly related to the strength of the near-field light, by maximizing the strength of the scattering light, the alignment of the slider 5 and the LD unit 18 is performed so that the strength of the near-field light that directly contributes to the heating of the magnetic recording medium is maximized. As a result, it becomes possible to increase the heat efficiency of the magnetic recording medium.

Figure 7:
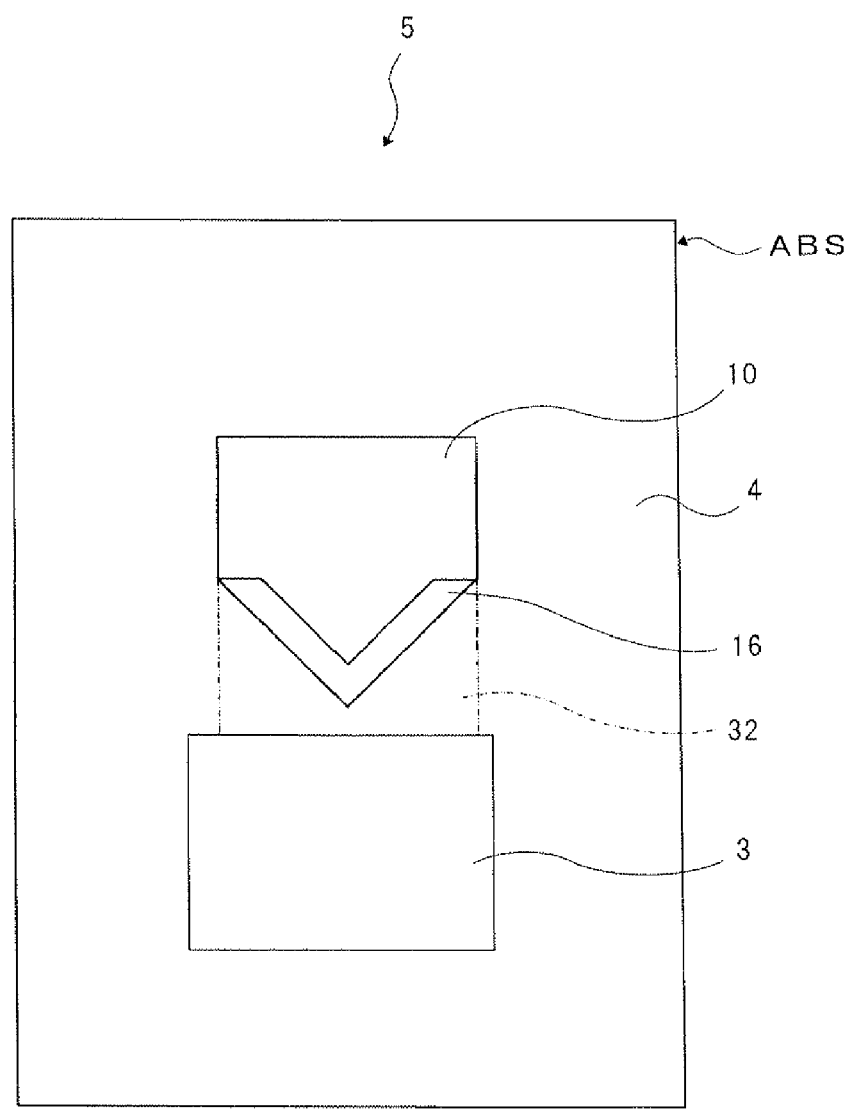
FIG. 7 is a front view illustrating the ABS of the slider of the thermally-assisted magnetic head of the present invention.
Figure 8:
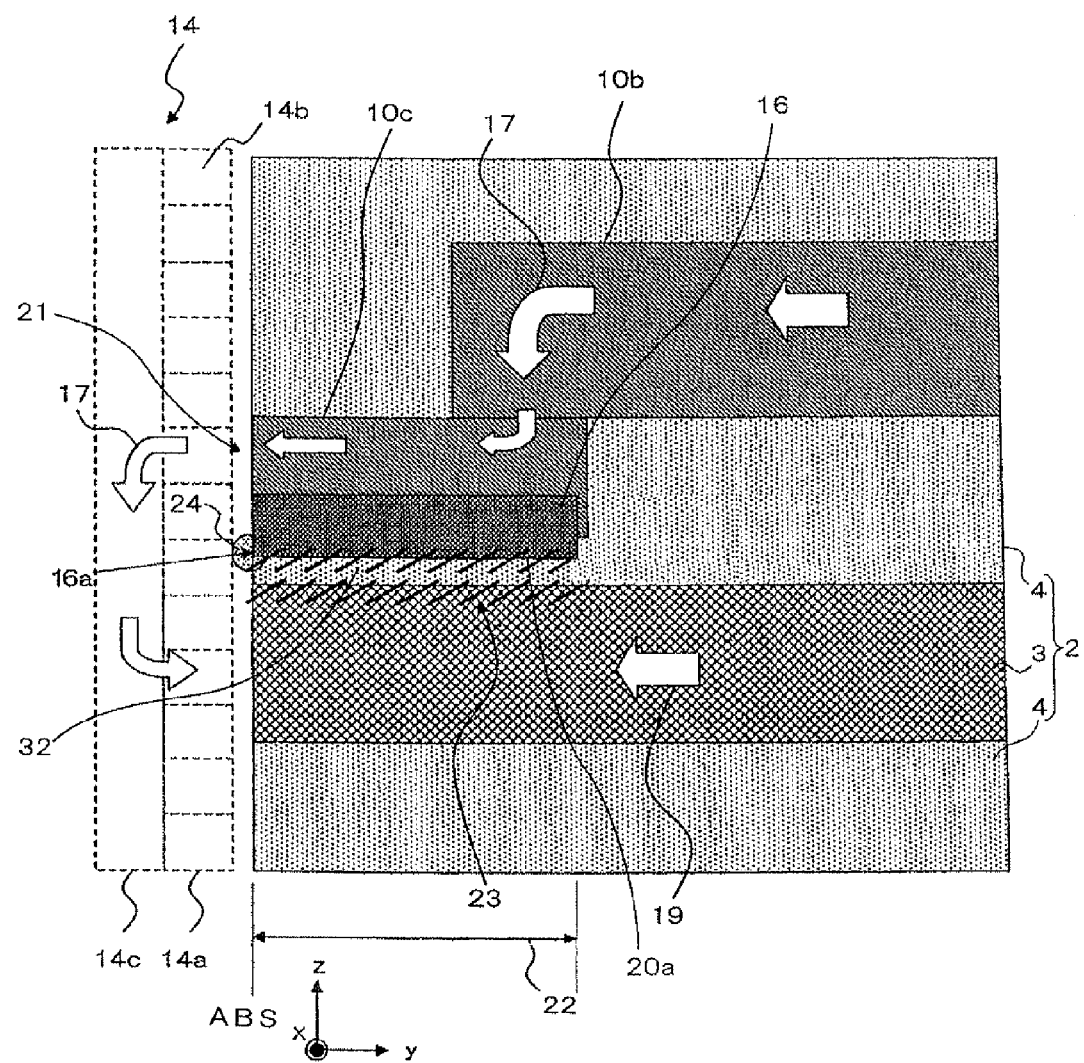
FIG. 8 is an enlarged view of the vicinity of a plasmon generator of the thermally-assisted magnetic head of the present invention.

Further detailed description of the thermally-assisted magnetic head 1 of the present invention will be given. FIG. 7 is a schematic view of the slider 5 of the thermally-assisted magnetic head 1 illustrated in FIG. 1, seen from the ABS side. FIG. 8 is an enlarged view of a part of the slider 5. As illustrated in FIG. 1, the slider 5 has a configuration where an MR element 7 that configures a reproducing head part and a magnetic recording element 21 that is a recording head part are layered on a substrate 6 made of ALTIC ($Al_2O_3$·TiC). In the following description, "lamination direction" indicates a film formation direction in a wafer formation process and a direction orthogonal to a film surface, and corresponds to the z-direction in each of the drawings. "Upper in the lamination direction" refers to a direction toward an overcoat layer 15 from the substrate 6. "Lower in the lamination direction" refers to a direction toward the substrate 6 from the overcoat layer 15.

The slider 5 includes, as the reproducing head part, the MR element 7 that has an end exposed to the ABS, and an upper shield layer 8 and a lower shield layer 9 that are disposed to sandwich the MR element 7 from the upper side and the lower side in the lamination direction. The MR element 7 can have any configuration utilizing a magneto resistive effect, such as for example a current in plane (CIP)—giant magneto resistive (GMR) element in which a sense current flows in the direction parallel to the film surface, a current perpendicular to plane (CPP)-giant magneto resistive (GMR) element in which the sense current flows in the direction perpendicular to the film surface (the lamination direction), or a tunneling magneto resistive (TMR) element that utilizes a tunnel effect, or the like. When a CPP—GMR element or a TMR element is applied to the MR element 7, the upper shield layer 8 and the lower shield layer 9 are also utilized as electrodes to supply the sense current.

The slider 5 provides the magnetic recording element 21 for a so-called perpendicular magnetic recording as the recording head part. The magnetic recording element 21 has a pole 10 for recording. The pole 10 has a first body part 10a, a second body part 10b, and a pole tip part 10e, which are formed of, for example, an alloy made of any two or three of Ni, Fe, and Co. A return shield layer 11 is disposed lower than the pole 10 in the lamination direction. The return shield layer 11 has a first body part 11a and a second body part 11b, which are also formed of an alloy made, for example, of any two or three of Ni, Fe and Co. The pole 10 and the return shield layer 11 are magnetically linked to each other via a contact part 12. In the present embodiment, the return shield layer 11 is disposed lower than the pole 10 in the lamination direction; however, it can be also disposed upper than the pole 10 in the lamination direction. The overcoat layer 15, made of $Al_2O_3$, is disposed upper than the pole 10 in the lamination direction.

Coils 13a and 13b are wound around the pole 10 centered on the contact part 12. Magnetic flux is generated at the pole 10 by a current applied to the coils 13a and 13b from the outside. The coils 13a and 13b are formed of a conductive material such as Cu, etc. The coils 13a and 13b in the present embodiment are disposed in a two-layer manner; however one layer or three or more layers are also practical. Furthermore, the number of windings is four in the present embodiment; however, the number is not limited to four.

The pole 10 is tapered at the pole tip part 10c in the vicinity of the ABS not only in the direction orthogonal to the film surface (the z-direction) but also in a cross track direction (the x-direction). Referring to FIG. 8, magnetic flux 17 generated in the pole 10 is tapered as it travels toward the ABS, and the minute and strong magnetic flux 17 for writing, which is suitable for the high recording density, is discharged toward the magnetic recording medium 14 from the pole tip part 10c positioned on the ABS. The magnetic recording medium 14 has a configuration for perpendicular magnetic recording. A surface layer of the magnetic recording medium 14 is a recording layer 14a. The magnetic flux 17 discharged from the pole tip part 10c travels in the recording layer 14a in the perpendicular direction (the y-direction), and magnetizes each recording bit 14b of the recording layer 14a in the perpendicular direction. After the magnetic flux 17 passes through the recording layer 14a, the magnetic path of the magnetic flux 17 turns in an in-plane direction of the magnetic recording medium 14 (the z-direction) in an under layer 14c underneath made from a soft magnetic body. Furthermore, the direction of the magnetic flux 17 changes to the perpendicular direction (the y-direction) again in the vicinity of the return shield layer 11, and the magnetic flux 17 is absorbed by the return shield layer 11. In other words, the return shield layer 11, illustrated in FIG. 1, functions to control the magnetic flux 17 such that the magnetic flux 17 passes perpendicularly through the recording layer 14a and creates the U-shaped magnetic path.

Furthermore, the second body part 11b of the return shield layer 11 forms a trailing shield part whose layer cross section is wider in the cross track direction (the x-direction) than the first body part 11a. The placement of such a return shield layer 11 causes a steeper gradient of the magnetic field between the return shield layer 11 and the pole 10 in the vicinity of the ABS. As a result, signal output jitter is reduced and an error rate at the time of reading is decreased.

The waveguide 2 and a plasmon generator 16 are disposed between the pole 10 and the return shield layer 11. The waveguide 2 is configured with the core 3 and the cladding 4 surrounding the core 3. The core 3 has a higher refractive index than the cladding 4. A laser light 19 (see FIG. 8), entering from the LD 28 into the core 3, is tapered by a spot size converter 3a (see FIG. 9) that is a tapered shape part of the core 3 while reflecting completely off the interface with the cladding 4, and propagates toward the ABS. The cladding 4 can be formed of, for example, $AlO_x$. The core 3 can be formed of, for example, $TaO_x$. Herein, $AlO_x$ indicates aluminum oxide of arbitrary composition, and $Al_2O_3$ is typical; however, $AlO_x$ is not limited to this. Similarly, $TaO_x$ indicates tantalum oxide of arbitrary composition, and $Ta_2O_5$, TaO, $TaO_2$, etc. are typical; however, $TaO_x$ is not limited to these. In order to connect to the LD 28, the core 3 extends from the ABS to a back surface 5a of the slider 5. In addition, although not illustrated in the drawings, the cladding 4 exists between the core 3 and the contact part 12 as well.

The plasmon generator 16 is disposed away from the substrate 6 and extends to the ABS facing a part of the core 3. The plasmon generator 16 is formed of Au, Ag, Cu, Al, Pd, Ru, Pt, Rh, Ir or an alloy primarily consisting of these metals.

Herein, a description of the plasmon generator 16 will be given. The plasmon generator 16 in the present embodiment is a metallic piece having a V-shaped cross section as illustrated in FIG. 7. An apex facing the core 3, which is on the V-shaped cross section of the plasmon generator 16, configures a propagation edge 20a extending in a longitudinal direction of the plasmon generator 16 (the y-direction). A buffer portion 32 is a portion sandwiched by the core 3 and a bottom surface of the plasmon generator 16, which includes the propagation edge 20a. In other words, the propagation edge 20a is covered by the buffer portion 32. The buffer portion 32 functions to couple the propagation light propagating through the core 3 with the plasmon generator 16 in the surface plasmon mode. The near-field-generator 16a is formed at an edge part on the ABS of the propagation edge 20a.

Because of such a configuration, as illustrated in FIG. 8, the plasmon generator 16, at the overlapping part 22 where the propagation edge 20a overlaps the core 3 and due to the function of the buffer portion 32, couples to propagating light 19 propagating through the core 3 in the surface plasmon mode, and generates a surface plasmon 23. The generated surface plasmon 23 propagates toward the ABS along the propagation edge 20a and reaches the near-field-generator 16a. Then, the propagated surface plasmon 23 generates near-field light 24 at the near-field-generator 16a.

Figure 9:
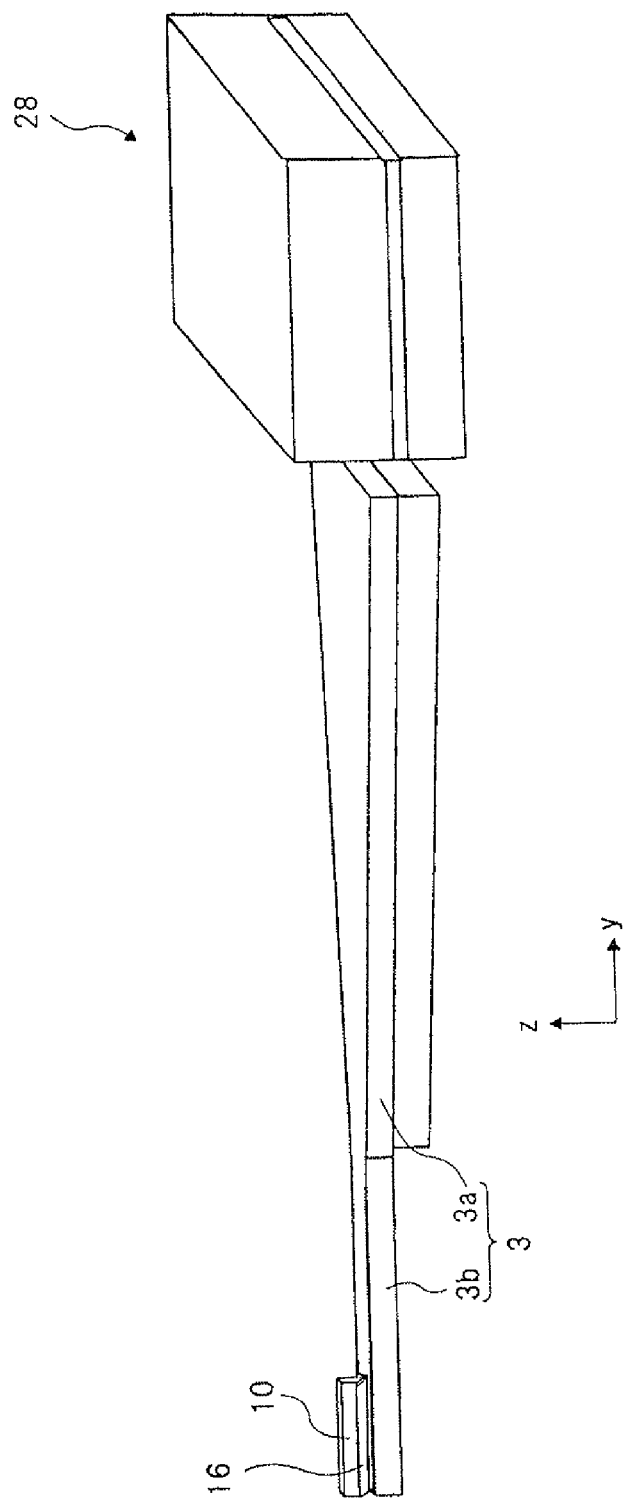
FIG. 9 is a perspective view illustrating one example of an LD, the plasmon generator, and a core of the thermally-assisted magnetic head of the present invention.

FIG. 9 illustrates only parts relating to light propagation. The plasmon generator 16 extends approximately parallel to the core 3 and in a direction (y-direction) perpendicular to the ABS. As illustrated in FIGS. 1 and 8, the plasmon generator 16 does not extend to the back surface 5a of the slider 5.

As illustrated in FIGS. 1, 2 and 9, the LD 28, being a light source, is linked to the back surface (light entering surface) 5a of the slider 5. The LD 28 has a pair of electrodes 25a and 25b, a positive (P) type cladding 26a and a negative (N) type cladding 26b that are sandwiched by the electrodes 25a and 25b, and an active layer 27 positioned between both of the claddings 26a and 26b, and these cleavage surfaces are in a reflecting mirror structure. The LD 28 is mounted on the LD sub-mount 29 illustrated in FIGS. 1-3, and is aligned properly with respect to the slider 5. The active layer 27 that continuously oscillates the laser light 19 is disposed on the same line as the core 3 of the slider 5 such that the laser light 19 generated in the active layer 27 enters into the core 3. The wavelength of the laser light 19 is not particularly limited; however, laser light having a wavelength of approximately 800 nm is preferably used.

The core 3 of the waveguide 2 may have a square pillar shape that extends having the same cross sectional shape, and the core 3 of the waveguide 2 may be configured with the spot-size convertor 3a and a straight part 3b as illustrated in FIG. 9. The spot-size convertor 3a is gradually tapered from the back surface 5a side of the slider 5, or in other words, from a side of the LD 28. The straight part 3b is positioned on the ABS side. As one example, a diameter of the propagating light 19 propagating through the core 3 is tapered when the propagating light 19 passes through the spot size converter 3a having a length of approximately 100 μm or less, and the propagating light 19 enters into the straight part 3b having a rectangular cross section of a width 0.6 μm×a height 0.4 μm.

When a magnetic recording is performed to the magnetic recording medium 14 utilizing the thermally-assisted magnetic head 1 that is structured as above, power is supplied to a pair of the electrodes 25a and 25b of the LD 28, which are linked to the back surface 5a of the slider 5, and then the active layer 27 generates the laser light 19 and the laser light 19 enters into the core 3 facing the active layer 27. The entered laser light 19 propagates toward the ABS in the core 3 as the diameter is tapered in the spot size converter 3a. At the overlapping part 22 overlapping with the core 3, the plasmon generator 16 couples to the propagating light 19 propagating through the core 3 in the surface plasmon mode due to the function of the buffer portion, and generates the surface plasmon 23. The surface plasmon 23 propagates along the propagation edge 20a of the plasmon generator 16 and reaches the near-field-generator 16a. The near-field light 24 is generated based on the surface plasmon 23 at the near-field-generator 16a. A portion (a portion to which information is recorded) of the recording layer 14a of the magnetic recording medium 14 is heated by this near-field light 24, and the coercive force is decreased. Then, simultaneously with this heating, current is applied to the coils 13a and 13b, magnetic flux is generated in the pole 10, and the information is written. Since the near-field-generator 16a for performing the heating and the pole 10 for performing the writing are closely positioned, the information is efficiently written to the portion of the recording layer 14a of the magnetic recording medium 14 where the coercive force is decreased due to the heating.

Next, one example of a manufacturing method of the thermally-assisted magnetic head 1 of the present invention will be explained. Additionally, a detailed explanation of each process to which a known method is applied is arbitrarily omitted.

Initially, as illustrated in FIG. 1, the lower shield layer 9, the MR element 7 that is a reproducing element, the upper shield layer 8, and the return shield layer 11 are laminated in this order above the substrate 6 that is made of $Al_2O_3$.TiC. Additionally, in the middle of this process, insulation layers are disposed respectively between the lower shield layer 9 and the upper shield layer 8 and between the upper shield layer 8 and the return shield layer 11.

Next, the cladding 4 made of $AlO_x$ and the core 3 made of $TaO_x$ are layered in this order, and a patterning is performed. Propagation of single mode light is necessary to excite the near-field light; and a cross sectional size of the core 3 must be a wavelength of the propagation light 19 or less, although it depends on the refractive indices of the core 3 and the cladding 4. In the present example, a patterning is performed on the core 3 such that an edge surface exposed on the ABS becomes a rectangle of width 0.6 μm×height 0.4 μm, and the laser light 19 having a wavelength of 0.8 μm propagates. In the figures, the cladding 4 formed beforehand and the cladding 4 newly formed in this process are illustrated in an integrated manner.

The cladding 4 that is a dielectric spacer layer is formed above the core 3, and a V-shaped groove is formed on an upper surface of the cladding 4. The plasmon generator 16 made of Au is formed in the groove. The plasmon generator 16 has a V-shaped cross section that corresponds to the shape of the groove. The pole 10 is formed thereabove. A lower part of the pole 10 is formed in an inverted triangle shape along the shape of the plasmon generator 16. In other words, the pole 10 that is configured with the inverted-triangle-shaped lower part and a quadrangle-shaped upper part is formed on the V-shaped plasmon generator 16. The cladding 4 is formed to surround the plasmon generator 16 and the pole 10. Then, the coil layers 13a and 13b and the overcoat layer 15, which are illustrated in FIG. 1, are formed.

The LD unit 18 is aligned with the slider 5, which is formed as described above, to link the LD 28 with the core 3 of the waveguide 2, and the LD unit 18 is attached to the slider 5. The LD unit 18 includes the LD 28 that generates laser light having a wavelength of 800 nm. This alignment process of the slider 5 and the LD unit 18 is a significant characteristic of this invention.

Specifically, the LD unit 18 is arranged such that the active layer 27 of the LD 28 aligns on a line that is approximately the same as the core 3 of the slider 5 at a position facing the light entering surface (the back surface 5a) that is different from the ABS of the slider 5. Then, as illustrated in FIG. 3, the photo detector 30 such as a photodiode is arranged in a position facing the ABS of the slider 5 so as to be arranged on a line that is approximately the same as the core 3. The polarizer 31 is arranged between the core 3 and the photodiode 30. The polarizer 31 transmits only the polarization component $D_2$. The polarization component $D_2$ (see FIG. 4B) is orthogonal to the polarization direction $D_1$ (see FIGS. 4A and 4B) of the linearly polarized laser light that enters into the core 3 from the LD 28 on the light entering surface, in the plane (the light reception surface of the polarizer) that is perpendicular to the traveling direction of the laser light. Additionally, a supporting mechanism of the photodiode 30 and the polarizer 31, and optical parts (such as lens, etc.) that exclude the photodiode 30 and the polarizer 31 are not illustrated.

Under this situation, current is supplied to the electrodes 25a and 25b to activate the LD 28, and the laser light enters into the core 3 from the back surface 5a (the light entering surface that is different from the ABS) of the slider 5 and propagates through the core 3. The photodiode 30 measures the strength of light that is emitted from the ABS and that is transmitted through the polarizer 31. Then, a relative position where the strength of the light measured by the photodiode 30 is maximized is determined while the slider 5 and the LD unit 18 are relatively moved, and the LD unit 18 and the slider 5 are fixed such that the relative position is maintained. The present applicants produced 30 thermally-assisted magnetic heads 1, which are an example of this invention, utilizing this method.

On the other hand, as a comparative example, a thermally-assisted magnetic head was produced by performing the same alignment under a situation where the polarizer 31 was removed. Namely, the LD 28 was activated so that laser light entered into the core 3 from the back surface 5a and propagates through the core 3. The photodiode 30 measures light strength (light without passing through the polarizer 31) that is emitted from the ABS. Then, a relative position where the strength of the light measured by the photodiode 30 is maximized is determined while the slider 5 and the LD unit 18 are relatively moved, and the LD unit 18 and the slider 5 are fixed such that the relative position is maintained. As described above, 30 thermally-assisted magnetic heads of the comparative example were formed.

Utilizing the 30 thermally-assisted magnetic heads 1 of the example of the present invention and the 30 thermally-assisted magnetic heads of the comparative example, which were produced as described above, experiments were performed. Through the experiments, magnetic recording to the recording medium 14 made of Felt was performed with the magnetic recording element 21, the magnetic recording was read by the MR element 7 that was close to the magnetic recording element 21, and an output at the timing of reading by the MR element 7 was obtained.

Generally, when current supplied to the electrodes 25a and 25b of the LD 28 for the thermally-assisted magnetic recording is increased, an output of the MR element 7 at the time of reading magnetic information recorded by the thermally-assisted magnetic recording is increased. However, when the current supplied to the electrodes 25a and 25b of the LD 28 reaches a certain amount, the output of the MR element 7 at the time of reading the magnetic information is constantly maintained and is no longer increased. The output of the MR element 7 at this point is referred to as the saturation output. Amounts of the current that were supplied to the electrodes 25a and 25b of the LD 28 when each Utile thermally-assisted heads reached the saturation output were recorded. Table 1 illustrates the results.

TABLE 1

| Example | | Comparative Example | |
|---|---|---|---|
| No. | Current (mA) | No. | Current (mA) |
| Example 1 | 19 | Comparative Example 1 | 27 |
| Example 2 | 20 | Comparative Example 2 | 25 |
| Example 3 | 18 | Comparative Example 3 | 18 |
| Example 4 | 20 | Comparative Example 4 | 24 |
| Example 5 | 19 | Comparative Example 5 | 23 |
| Example 6 | 15 | Comparative Example 6 | 19 |
| Example 7 | 18 | Comparative Example 7 | 25 |
| Example 8 | 18 | Comparative Example 8 | 32 |
| Example 9 | 19 | Comparative Example 9 | 20 |
| Example 10 | 21 | Comparative Example 10 | 31 |
| Example 11 | 16 | Comparative Example 11 | 29 |
| Example 12 | 18 | Comparative Example 12 | 30 |
| Example 13 | 19 | Comparative Example 13 | 22 |
| Example 14 | 20 | Comparative Example 14 | 23 |
| Example 15 | 21 | Comparative Example 15 | 26 |
| Example 16 | 24 | Comparative Example 16 | 21 |
| Example 17 | 19 | Comparative Example 17 | 27 |
| Example 18 | 20 | Comparative Example 18 | 29 |
| Example 19 | 22 | Comparative Example 19 | 20 |
| Example 20 | 19 | Comparative Example 20 | 38 |
| Example 21 | 18 | Comparative Example 21 | 22 |
| Example 22 | 19 | Comparative Example 22 | 25 |
| Example 23 | 21 | Comparative Example 23 | 24 |
| Example 24 | 17 | Comparative Example 24 | 27 |
| Example 25 | 17 | Comparative Example 25 | 34 |
| Example 26 | 19 | Comparative Example 26 | 32 |
| Example 27 | 20 | Comparative Example 27 | 25 |
| Example 28 | 19 | Comparative Example 28 | 27 |
| Example 29 | 20 | Comparative Example 29 | 26 |
| Example 30 | 27 | Comparative Example 30 | 31 |
| Average | 19.4 | Average | 26.1 |
| Standard Deviation | 2.3 | Standard Deviation | 4.7 |

The example of the present invention included the polarizer 31 that exists between the core 3 and the photo detector 30; on the other hand, the comparative example did not include the polarizer 31. According to Table 1, with the example of the present invention, the current (approximately 74%) that was supplied to the electrodes 25a and 25b of the LD 28 for reaching the saturation output was smaller than the comparative example. This shows that, with the present invention, the reading output of the magnetic information by the MR element 7 becomes large even when the current supplied to the electrodes 25a and 25b of the LD 28 is small; in other words, this means that the magnetic recording is efficiently performed. Moreover, the example of the present invention has a standard deviation that is equal to or less than half of that of the comparative example, so that the variation of the magnetic recording efficiency is small.

The reasons are considered as follows. The thermally-assisted magnetic head, which performs magnetic recording while heating the recording medium with near-field light, generates the near-field light by converting light (laser light) that has an identical phase and that excites the near-field light. However, it is actually impossible to convert the laser light into the near-field light at 100% efficiency. Specifically, in the thermally-assisted magnetic head that utilizes the above-described evanescent light, when a length of the plasmon generator 16 and a gap between the plasmon generator 16 and the core 3 of the waveguide 2 are slightly different from ideal values, propagation light that propagates through the core 3 but does not couple to the plasmon generator 16 is generated, and the propagation light radiates from the ABS as it is. When the large-sized core 3 is produced in order to increase a propagation efficiency of single mode light, multimode light inevitably coexists. The coexisting multimode light as above-described is, in principle, difficult to be coupled with the plasmon generator 16, and a ratio of radiating as it is from the ABS is large.

As described above, there is no specific correlation between the strength of the propagation light that radiates from the ABS as it is without coupling to the plasmon generator 16 and the strength of the near-field light (and the secondary scattering light) that is generated as a result of the propagation light coupling to the plasmon generator 16. Also, a position where the propagation light radiates from the ABS as it is without coupling to the plasmon generator 16 and a position where the near-field light (and the secondary scattering light) is emitted from the ABS are different, and the strength of the propagation light is extremely large compared to the strength of the near-field light (and the secondary scattering light).

In the comparative example, it is impossible for the photo detector 30 to distinguish and selectively detect the propagation light that radiates from the ABS as it is without coupling to the plasmon generator 16 and the near-field light (and the secondary scattering light). As a result, light strength detected by the photo detector 30 is primarily light strength of the propagation light that radiates from the ABS as it is without coupling to the plasmon generator 16, with the near-field light (and the secondary scattering light) having a minimal effect. Since the propagation light that radiates from the ABS as it is without coupling to the plasmon generator 16 only minimally contributes to the heating of the recording medium, the light strength that is detected by the photo detector 30 does not indicate energy for heating the recording medium. Therefore, it is impossible to obtain the best heating efficiency of the recording medium even if the alignment of the slider 5 and the LD unit 18 is performed based on the light strength.

On the other hand, the light strength of the near-field light and the energy for heating the recording medium are strongly correlative. Furthermore, the near-field light and the secondary scattering light accompanied therewith are strongly correlative. Accordingly, when the photo detector 30 detects the light strength of the secondary scattering light in accompaniment with the near-field light, it is assumed that the light strength shows the energy to heat the recording medium. Therefore, in the present invention, the photo detector 30 is arranged to detect only the scattering light. Specifically, the polarizer 31 is disposed on a light path between the ABS and the photo detector 30 such that only the scattering light out of light that radiates from the ABS is transmitted. As an explanation of this point, the propagation light that radiates from the ABS as it is without coupling to the plasmon generator 16 maintains a linear polarization at the time of entering into the core 3. Herein, for convenience, the laser light that enters into the core 3 is defined as transverse magnetic field (TM) light having the polarization direction $D_1$ that is perpendicular to the ABS (see FIGS. 4A and 4B). On the other hand, the scattering light that is generated in accompaniment with the near-field light that is converted from the TM light has the polarization component $D_2$ (see FIG. 4B) rotated by 90 degrees from the polarization direction $D_1$ of pre-converted light. In other words, the scattering light is transverse electric field (TE) light with a polarization direction rotated by 90 degrees from the TM light. Therefore, when the polarizer 31 through which only the TE light transmits is utilized, the effect of the propagation light (the TM light) that does not contribute to the heating of the recording medium is eliminated, and only the light strength of the scattering light (the TE light) that shows the energy for heating the recording medium can be detected. When the photo detector 30 detects the light that transmits through the polarizer 31, the energy for heating the recording medium can be obtained.

As described above, the relative position between the slider 5 and the LD unit 18 is adjusted while the light strength of the scattering light is measured with the polarizer 31 and the photo detector 30, and the LD unit 18 is fixed to the slider 5 so that the light strength of the scattering light is maximized. As a result, as illustrated in Table 1, energy efficiency to heat the recording medium is easily increased and heating variation is suppressed. Furthermore, since it is possible to decrease current supplied to the electrodes 25a and 25b of the LD 28 due to the improvement of the energy efficiency, the lifetime of the LD 28 is prolonged and unnecessary heating on the thermally-assisted magnetic head 1 itself is suppressed. As a result, partial projection of the slider 5 due to heat expansion and sequential migration of a portion (especially, the magnetic recording element 21) of the slider 5 are suppressed.

The above-described embodiment relates to the thermally-assisted magnetic head 1 using evanescent light; however, the present invention is also applicable to other thermally-assisted magnetic heads that use near-field light for thermally-assisted magnetic recording because light having a component of which the polarization direction changes by 90 degrees is generated when the near-field light is generated.

Figure 10:
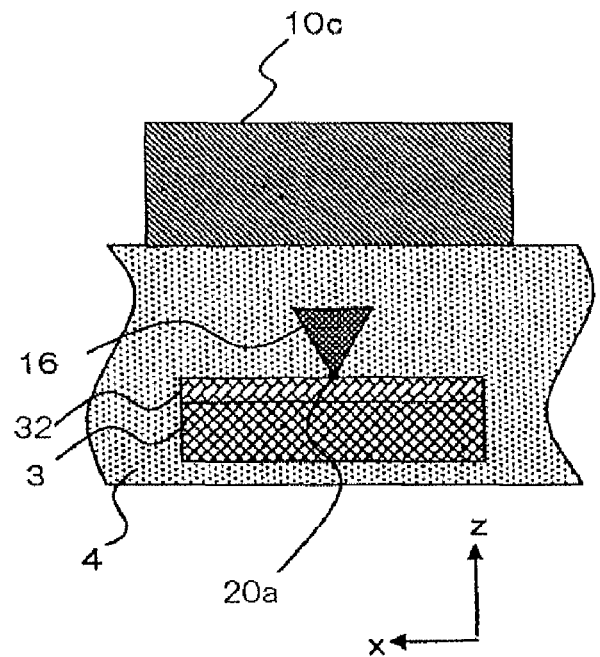
FIG. 10 is a front view illustrating one part of an ABS of a slider, which is another example, of the thermally-assisted magnetic head of the present invention.
Figure 11:
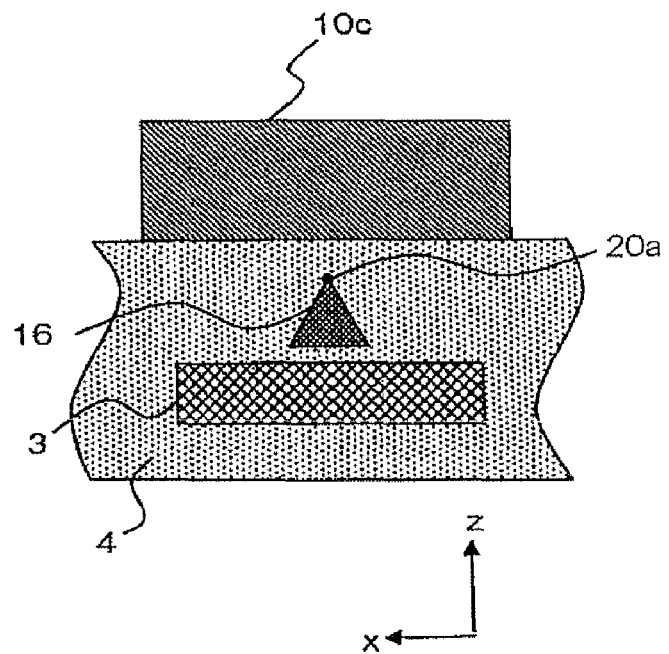
FIG. 11 is a front view illustrating one part of an ABS of a slider, which is another example, of the thermally-assisted magnetic head of the present invention.

Also, the present invention is applicable to the configuration that has an inverted-triangular plasmon generator 16 as illustrated in FIG. 10 and the configuration that has a triangular plasmon generator 16 as illustrated in FIG. 11; but is not limited to the configuration that has a V-shaped plasmon generator 16 as illustrated in FIG. 7. In the case of the configuration illustrated in FIG. 11, the propagation edge 20a of the plasmon generator 16 is positioned on an opposite side from the core 3.

The light entering surface of the slider 5 of the above-described embodiment is the surface (the back surface 5a) that is opposite from the ABS; however, another surface other than the back surface 5a is applicable as long as the surface is different from the ABS.

Figure 12:
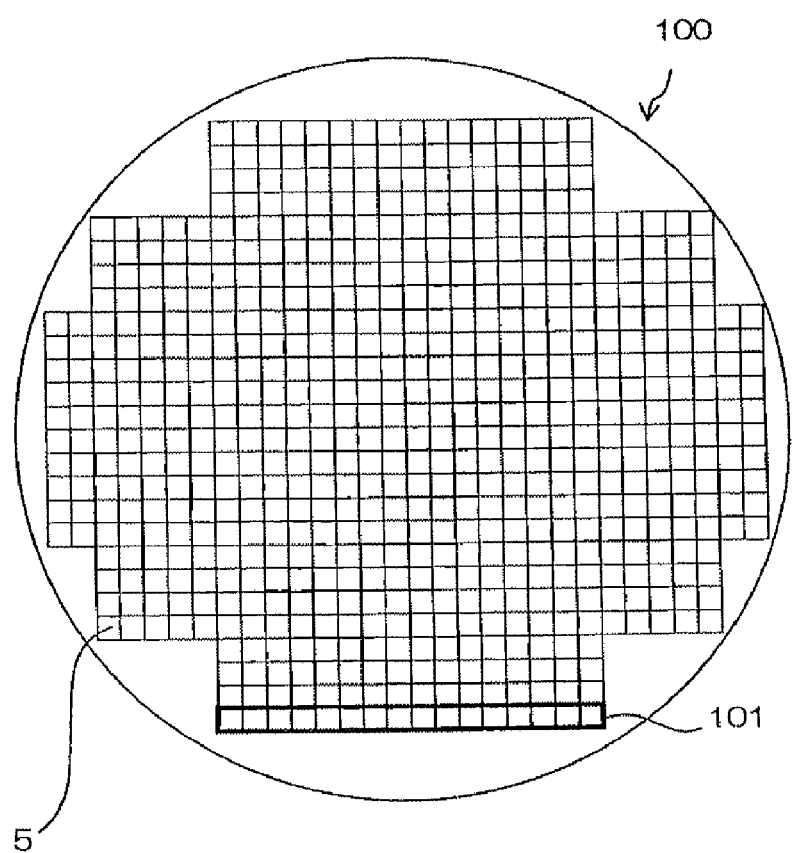
FIG. 12 is a plan view of a wafer where a large number of stacks that configure the slider of the thermally-assisted magnetic head of the present invention are formed.
Figure 13:
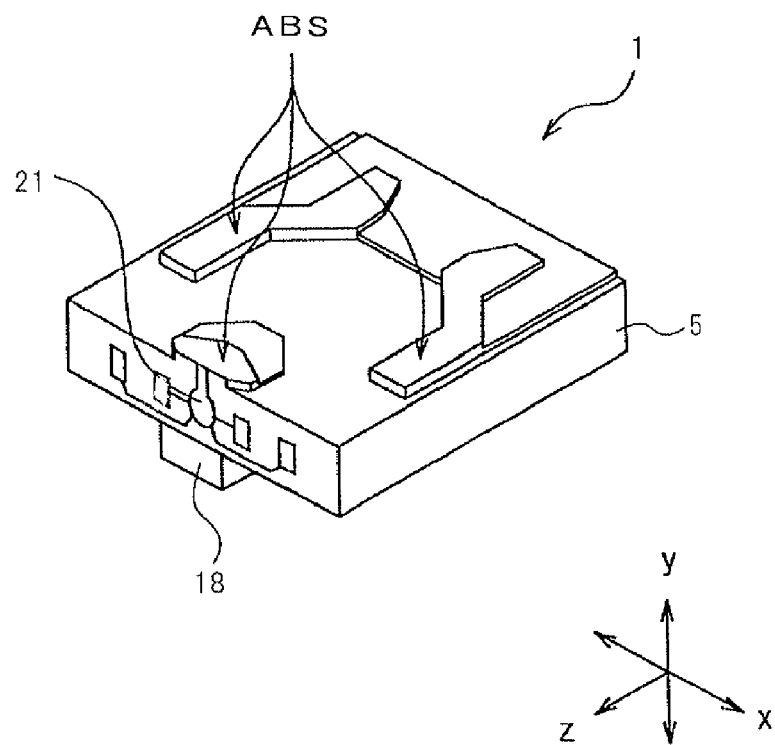
FIG. 13 is a perspective view of the thermally-assisted magnetic head of the present invention, as seen from an ABS side.

When a large number of thermally-assisted magnetic heads 1 are manufactured, a large number of stacks are formed to configure the above-described slider 5 on a wafer 100 illustrated in FIG. 12. The wafer 100 is cut into a plurality of bars 101, which are working units for the polishing process of the ABS. The bar 101 is further cut after the polishing process and is divided into a plurality of the sliders 5. Margins for cutting (not illustrated) that are for cutting the wafer 100 into the bar 101 and for cutting the bar 101 into the slider 5 are formed in the wafer 100. Referring to FIG. 13, each of the sliders 5 has a substantially hexahedral shape, and one surface of the six outer surfaces is the ABS facing a hard disk 14 that is a recording medium. Then, the LD unit 18, which is aligned with respect to the slider 5 in the above-described alignment process, is attached to the slider 5, and the thermally-assisted magnetic head 1 is configured.

Figure 14:
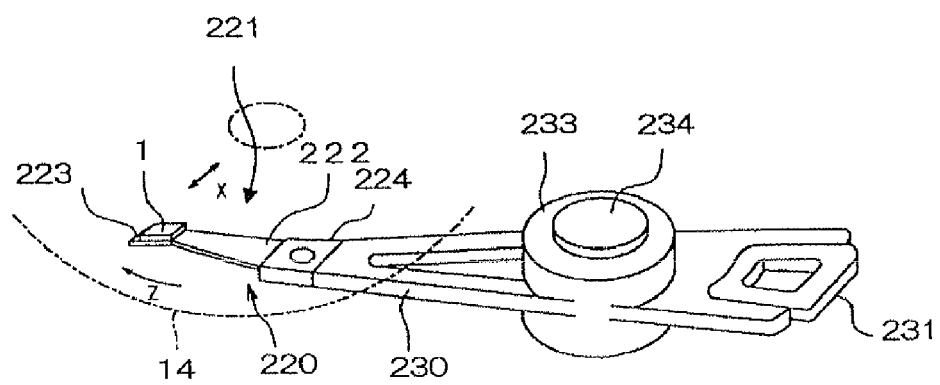
FIG. 14 is a perspective view of a head aim assembly that includes a head gimbal assembly in which the thermally-assisted magnetic head of the present invention is incorporated.

Referring to FIG. 14, a head gimbal assembly 220 has the thermally-assisted magnetic head 1 and a suspension 221 elastically supporting the thermally-assisted magnetic head 1. The suspension 221 has a load beam 222, a flexure 223, and a base plate 224. The load beam 222 is formed in a plate spring shape and is made of stainless steel. The flexure 223 is arranged in one edge part of the load beam 222. The base plate 224 is arranged in the other edge part of the load beam 222. The flexure 223 is joined to the thermally-assisted magnetic head 1 to give the thermally-assisted magnetic head 1 suitable flexibility. At the part of the flexure 223 to which the thermally-assisted magnetic head 1 is attached, a gimbal part is disposed to maintain the thermally-assisted magnetic head 1 in an appropriate orientation.

The thermally-assisted magnetic head 1 is arranged in the hard disk device such that the thermally-assisted magnetic head 1 faces the hard disk 14, which is a disk-shaped recording medium that is rotatably driven. When the hard disk 14 rotates in the z-direction of FIG. 14, air flow passing between the hard disk 14 and the thermally-assisted magnetic head 1 generates a downward lifting force in the y-direction to the thermally-assisted magnetic head 1. The thermally-assisted magnetic head 1 flies from the surface of the hard disk 14 due to the lifting force. In the vicinity of the edge part of the thermally-assisted magnetic head 1 of the slider 5 at the air flow exit side (left side of FIG. 13), the magnetic recording element 21 is formed.

A part in which the head gimbal assembly 220 is mounted on an arm 230 is referred to as a head arm assembly 221. The arm 230 moves the thermally-assisted magnetic head 1 in the track crossing direction x of the hard disk 14. One edge of the arm 230 is mounted on the base plate 224. On the other edge of the arm 230, a coil 231 is mounted, which forms one part of a voice coil motor. A bearing part 233 is arranged in the middle section of the arm 230. The arm 230 is rotatably supported by a shaft 234 mounted on the bearing part 233. The aim 230 and the voice coil motor for driving the aim 230 configure an actuator.

Figure 15:
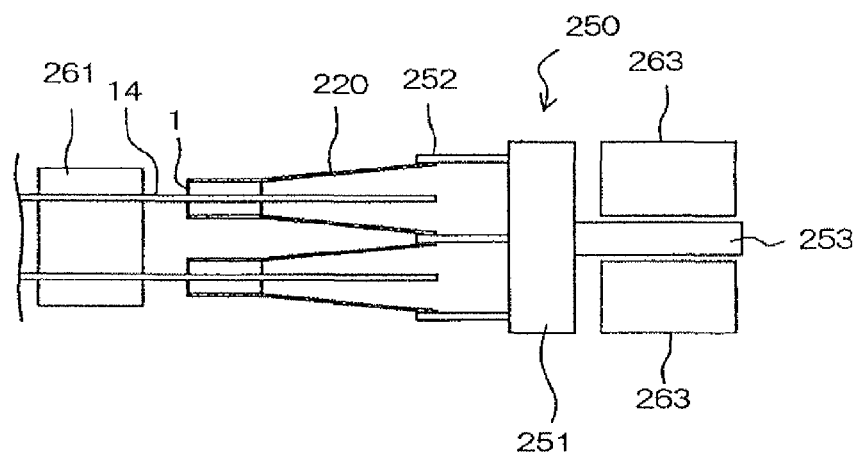
FIG. 15 is a side view of the head arm assembly in which the thermally-assisted magnetic head of the present invention is incorporated.
Figure 16:
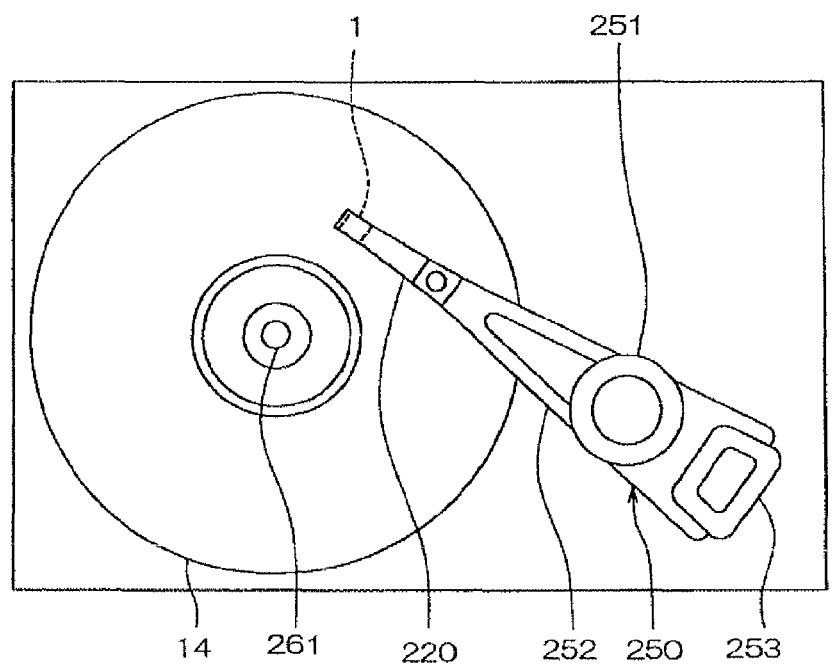
FIG. 16 is a plan view of a hard disk device in which the thermally-assisted magnetic head of the present invention is incorporated.

Next, referring to FIGS. 15 and 16, a head stack assembly, in which the above-described thermally-assisted magnetic head 1 is integrated, and the hard disk device will be explained. Head stack assembly is a component in which the head gimbal assemblies 220 are respectively mounted on a plurality of the arms provided in a carriage. FIG. 15 is a side view of the head stack assembly. FIG. 16 is a plan view of the hard disk device. The head stack assembly 250 includes a carriage 251 having a plurality of arms 252. On each of the arms 252, the head gimbal assembly 220 is mounted so that the head gimbal assemblies 220 align at an interval in the vertical direction. At the opposite side of the arm 252 from the carriage 251, the coil 253 is mounted to be a part of the voice coil motor. The voice coil motor has permanent magnets 263 arranged sandwiching the coil 253 and facing each other.

Referring to FIG. 16, the head stack assembly 250 is integrated in the hard disk device. The hard disk device has multiple hard disks 14 mounted on a spindle motor 261. On each of the hard disks 14, two sliders 5 are arranged in a manner of sandwiching the hard disk 14 and facing each other. The head stack assembly 250 except for the thermally-assisted magnetic head 1 and an actuator, corresponding to a positioning device of the present invention, not only support the thermally-assisted magnetic head 1 but also position the thermally-assisted magnetic head 1 with respect to the hard disk 14. The thermally-assisted magnetic head 1 is moved in the track crossing direction of the hard disk 14 by the actuator, and is positioned with respect to the hard disk 14. The magnetic recording element 21 included in the thermally-assisted magnetic head 1 records information to the hard disk 14, and reproduces the information recorded on the hard disk 14 by the MR element 7.

While preferred embodiments of the present invention have been described and explained in detail, such description is for illustrative purposes only, and it is to be understood that changes and variations may be made without departing from the spirit or scope of the following claims.

What is claimed is:

1. A method for manufacturing a thermally-assisted magnetic head that includes a slider and a laser diode unit, the slider including an air bearing surface (ABS) that faces a recording medium and including a waveguide with a core for light propagation that extends from a light entering surface, which is different from the ABS, to the ABS, the laser diode unit being attached to the light entering surface of the slider, and the thermally-assisted magnetic head performing magnetic recording while heating the recording medium with near-field light that is excited from linearly polarized laser light, the method comprising:

a step of disposing the laser diode unit in a position facing the light entering surface of the slider, disposing a photo detector in a position facing the ABS of the slider, and disposing a polarizer between the ABS and the photo detector, the polarizer transmitting only light having a polarization component that is orthogonal to a polarization direction of linearly polarized laser light;

a step of activating a laser diode of the laser diode unit, and enabling the linearly polarized laser light to enter into the core from the light entering surface of the slider; and a step of enabling light radiated from the ABS to enter into the polarizer, and performing an alignment of the slider and the laser diode unit while the photo detector detects the light that is transmitted through the polarizer.

2. The method according to claim 1, wherein the light entering surface is a surface that is on an opposite side from the ABS.

3. The method according to claim 1, wherein
the alignment of the slider and the laser diode unit is performed in order to maximize strength of the light detected by the photo detector.

4. The method according to claim 3, wherein
the polarizer transmits only the light having the polarization component that is orthogonal to the polarization direction of the linearly polarized laser light in a light reception surface of the polarizer.

5. The method according to claim 4, wherein the light transmitted through the polarizer is scattering light generated in accompaniment with excitation of the near-field light.

6. The method according to claim 5, wherein
a plasmon generator facing a part of the core is formed in the slider,
the plasmon generator includes a propagation edge extending to the ABS, through which surface plasmon, which is generated by coupling to the laser light propagating through the core in a surface plasmon mode, propagates, and
a near-field-generator is disposed at an edge part, positioned on the ABS, of the propagation edge.

* * * * *